Dec. 30, 1969 C. J. ABEND ET AL 3,486,322
GEOGRAPHICAL CLOCK HAVING A SPACECRAFT
ELEMENT ASSOCIATED THEREWITH
Filed March 17, 1967 2 Sheets-Sheet 1
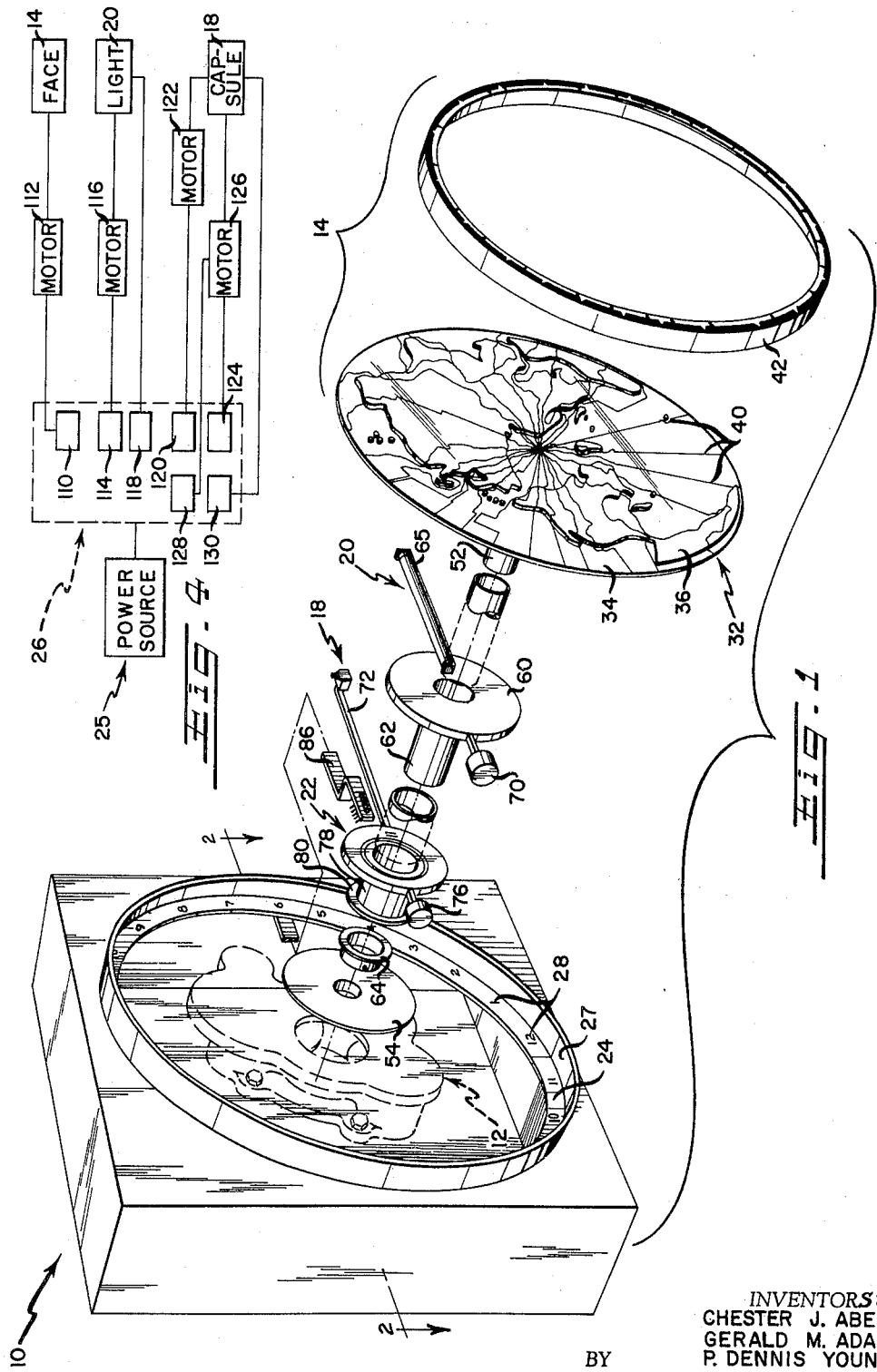
INVENTORS:
CHESTER J. ABEND
GERALD M. ADAMS
BY P. DENNIS YOUNGE
AGENT

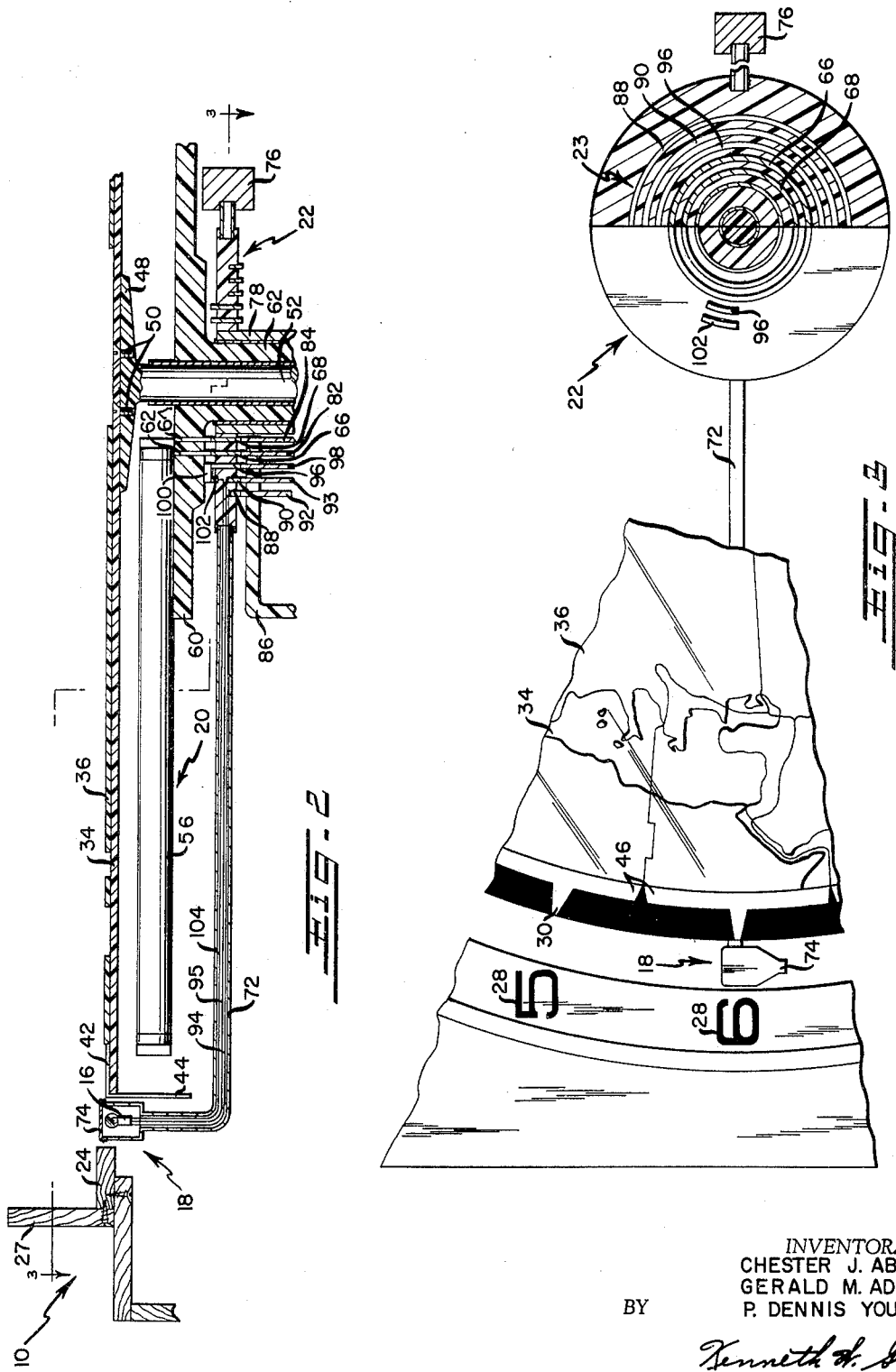

3,486,322
GEOGRAPHICAL CLOCK HAVING A SPACECRAFT ELEMENT ASSOCIATED THEREWITH
Chester J. Abend, Camillus, Gerald M. Adams, Fayetteville, and Paul Dennis Younge, Syracuse, N.Y., assignors to SCM Corporation
Filed Mar. 17, 1967, Ser. No. 623,871
Int. Cl. G04b *19/22*
U.S. Cl. 58—43                                     11 Claims

ABSTRACT OF THE DISCLOSURE

A time indicating device having a spacecraft element rotatable relative to a stationary twenty-four hour numbered ring and relative to a rotatable face unit which includes a map of the Northern Hemisphere and appropriate time zone markings thereon. The spacecraft element is selectively operable to be launched at the time of an actual spacecraft orbital flight, to rotate at a rate substantially squal to the rate of an actual orbital flight (such as a Gemini flight), and to reduce the rate of rotation at the end of an actual flight. The face unit rotates at the rate of one revolution per twenty-four hours and the spacecraft element rotates at the same rate therewith when there is no spacecraft in flight.

BACKGROUND OF THE INVENTION

This invention relates to a time indicating device on display to the general public and more particularly to a hemispheric, twenty-four hour, electric clock having a rotatable spacefraft element associated therewith.

These is no known electric clock of this type having a spacecraft element selectively operable to rotate during an actual spacecraft orbiting misssion.

SUMMARY OF THE INVENTION

This invention comprises a hemispheric electric clock having a face unit displaying the Northern Hemisphere with the appropriate time zone markings thereon which is rotatable relative to a stationary numbered ring at the rate of one revolution for every twenty-four hour period and having a spacecraft element rotatable with the face unit. Under these conditions, the clock is readable at a glance to determine the time at any location on the Northern Hemisphere and to indicate the absence of an actual spacecraft orbital flight.

An object of this invention is to provide a spacecraft element selectively operable to rotate faster than the rate of the rotating face unit and substantially equal to the rate of an actual spacecraft orbital flight relative in time and scale.

Another object of this invention is to provide an adjustable power source to rotate the spacecraft element at rates substantially equal to the varying rates of different orbiting flights.

Another object of this invention is to provide a spacecraft element with an electric lamp and electrical connections therefor to intermittently energize the lamp which is selectively operable to be effective while the spacecraft element is at rest or rotating.

A further object of this invention is to provide a hemispheric time indicating device with a fluorescent light unit positioned behind the face unit and rotable in a direction opposite of the face unit and electrical connections therefor to continuously energize the light during the rotation thereof. The electrical connections includes adding electric power to the spacecraft lamp momentarily as the fluorescent light crosses the path of the spacecraft lamp to momentarily increase the intensity thereof.

BRIEF DESCRIPTION OF THE DRAWINGS

FIGURE 1 is an exploded perspective view showing the principle construction of the present invention;

FIGURE 2 is a partial sectional view to an enlarged scale taken substantially along line 2—2 of FIGURE 1 as is would appear when assembled;

FIGURE 3 is a partial sectional view taken substantially along line 3—3 of FIGURE 2; and FIGURE 4 is a block diagram illustrating a control system for the present invention.

DESCRIPTION OF THE PREFERRED EMBODIMENT

The invention mainly comprises a housing 10 made from wood or any suitable material, a gear means 12 supported within the housing, a transluscent clock face unit 14 rotatable by the gear means. A spacecraft element 18 having an incandescent light bulb 16 supported therein rotable by the gear means 12 in the same direction as the face unit 14, a fluorescent light unit 20 rotatable by the gear means 12 in a direction opposite of the face unit 14 and the spacecraft element 18, an electrical slip ring member 22 rotatable by the gear means 12 having a plurality of slip rings 23 for transmitting electric power from a conventional power source 25 to energize lights 16 and 20 and having the spacecraft element 18 carried therewith and a control panel 26 (FIGURE 4) having switches for independently controlling the above described features.

The housing 10 has a circular hour number ring 24 with a relatively short and thin circular wall 27 rigidly mounted on its periphery and extending outwardly therefrom. Numerals 28 of numbered ring 24 includes one through twelve to correspond to the daytime hours and a second set of one through twelve to correspond to the nighttime hours, all of which form the circular ring. The face unit 14 has a series of pointers 30 around the periphery thereof directed toward the numerals 28 and sufficiently spaced from each other to point to each hour on the numbered ring 24 thereby associating the orientation of the time zone markings of the face unit with the hour numerals.

The face unit 14 is constructed from a transparent circular disc 32 of plastic material. The water areas 34 are painted gray on the back side of the disc. The land areas 36 are cut from a green transluscent plastic material and cemented on the front of the disc 32. The Northern Hemisphere polar projection time zone markings 40 are strips of narrow white tape applied on the front of the disc assembly over the water and land areas. A ring 42 formed from thin sheet metal or any suitable material is cemented on the periphery of the circular disc 32 having a wall 44 extending inward into the clock substantially parallel with the rotational axis of the face unit 14. The ring 42 is coated with gun metal gray paint and the areas 46 forming the pointers 30 are painted white. The assembled face unit 14 is rigidly mounted on a flange 48 by screws 50. The flange 48 is integral with a shaft 52 with a gear 54 rigidly mounted thereon which extends into the gear means 12 for rotating the face unit 14 counterclockwise one revolution per twenty-four period.

The fluorescent light unit 20 includes a fluorescent light bulb 56 supported by a fixture 58 which, in turn, is supported on a disc 60. Disc 60 has a sleeve 62 extending into the gear means 12 with a gear 64 rigidly assembled thereon which is driven by the gear means to rotate the light unit 20 clockwise two revolutions per minute. The light bulb 56 extends from near the center of the face unit to near the periphery thereof. The fixture 58 includes a metal strip 65 positioned on the leading side of the light unit 20 to shield the light from extending in the direction of travel but allows the light to trail the light unit thereby providing a radar sweep effect over the Northern Hemisphere. The disc 60 has a pair of electrical conductors 62 and 64, each having one end connected to fixture 58 for energizing light bulb 56 and having the other end contact slip rings 66 and 68 respectively supported in member 22. A weight 70 is rigidly supported on disc 60 positioned diametrically opposite the light bulb 56 to counterbalance the bulb 56 and fixture 58.

The spacecraft element 18 is positioned closely between the numbered ring 24 and the disc 42 and is supported on the slip ring member 22 by a hollow arm 72 formed from plastic or any suitable material having the supporting end threaded into member 22. Element 18 has a space capsule shaped cover 74 made from a transluscent plastic material pivotally hinged thereon for installing bulb 16. Wall 44 extending from disc 42 shields element 18 from the light from the fluorescent bulb 56. A weight 76 is rigidly supported on member 22 positioned diametrically opposite element 18 as a counterbalance therefor.

The electrical slip ring member 22 has a sleeve 78 extending into the gear means 12 with a gear 80 rigidly assembled thereon. Gear 80 is driven by the gear means 12 to rotate the spacecraft element 18 counterclockwise at the rate of one revolution for each twenty-four hour period which is equal to the rate of the face unit 14. When traveling with the face unit 14, element 18 is normally in radial alignment with Cape Kennedy, Fla., where most of the spacecraft flights are launched. Gear 80 is driven by gear means 12 through a different gear ratio to rotate the element 18 at a rate substantially equal to an actual flight which would be approximately one revolution for each 90 minute period.

The electrical slip ring member 22 carries a plurality of slip rings 23 as a current conducting means to transmit current from the power source 25 to energize light bulbs 16 and 56. Slip rings 66 and 68 are continuous circular rings extending through member 22 to provide a circuit to energize the fluorescent bulb 56 continuously during the rotation thereof. A pair of electrical terminals 82 and 84 are assembled on a rigid support 86 and contact slip rings 66 and 68. Power source 25 provides 115 volts A.C. power to terminals 82 and 84.

Slip rings 88 and 90 are continuous circular rings which are positioned on the back side of disc 22. A pair of electrical terminals 92 and 93 are assembled on support 86 and contact slip rings 88 and 90 at one end. Current conductive wires 94 and 95 connect the opposite ends of slip rings 88 and 90 to bulb 16. Terminal 92 is supplied with intermittent 12 volts D.C. by any conventional means from power source 25 and terminal 93 provides a ground return circuit therefor. The light bulb is energized through these connections by a power source that energizes the bulb for one-half second and deenergizes the bulb for one second repeatedly and is so operable whether the spacecraft element (18) is at rest or is rotating. A circular slip ring 96 extends through member 22 for only a few degrees of a circle having one end contacted by an electrical terminal 98 and having the other end contacted by a current conductive bridge 100. Bridge 100 is rigidly assembled to the back side of disc 60. A slip connector 102 is only a few degrees of a circle and is mounted on the front side of member 22 having one end contact bridge 100 and having the other end connected by a current conductive wire 104 which is connected to light bulb 16. Terminal 98 is supplied with 24 volts D.C. by conventional means from power source 25 which is effective to momentarily increase the intensity of light bulb 16 each time light unit 20 carries bridge 100 to electrically connect slip ring 96 to slip connector 102. A direct current circuit is completed by connecting terminal 98, slip ring 96, bridge 100, slip connector 102, wire 104, bulb 16, slip ring 90 and ground return terminal 93. Thus, bulb 16 is supplied with additional D.C. voltage two times a minute which is the rate of rotation of light unit 20 and which occurs substantially at the time the light unit 20 crosses the path of spacecraft element 18.

Referring to FIGURE 4, the control panel 26 has the necessary circuitry interconnecting the power source 25 to each of the previously described items. The panel 26 includes a switch 110 to energize a conventional electric motor 112 that rotates gear 54 to rotate the face unit 14 counterclockwise at the rate of one revolution in a twenty-four hour period. A switch 114 on the panel is to energize a motor 116 that rotates gear 64 to rotate the light unit 20 clockwise at the rate of two revolutions per minute. A switch 118 provides a separate control for energizing fluorescent bulb 56 of unit 20. A switch 120 energizes a motor 122 that rotates gear 80 to rotate spacecraft element 18 counterclockwise at the rate of one revolution in a twenty-four hour period. A switch 124 energizes a direct current motor 126 and through any suitable clutching means that disconnects motor 122 from gear 80 and connects a different gear ratio to gear 80 driven by motor 126 to rotate element 18 at a rate of one revolution in approximately a ninety minute period. This rate is adjustable for different spacecraft flights having different orbital rates by varying the direct current voltage energizing motor 126. A control knob 128 on control panel 26 provides this adjustment. A switch 130 closes the circuit to cause light bulb 16 to continuously blink during the rotation of element 18. Switch 120 is turned to OFF position and switch 124 is actuated to an ON position as soon after an actual launching of a spacecraft at Cape Kennedy and after it enters its orbital flight as practical to put element 18 in motion for illustrating an actual flight. Element 18 is adjusted to rotate at a rate substantially equal to the actual flight and remains in rotation continuously during the actual flight thereby providing an observer a visual observation of the time and location of the actual spacecraft at any time during an entire flight. Switch 124 is actuated to an OFF position approximately at the time that the spacecraft starts its re-entry. Switch 120 is then turned to ON position at an appropriate time when element 18 is in radial alignment with Cape Kennedy, Fla.

The overall visual effect produced by the invention for an observer when there is no actual spacecraft flight in progress is the showing of a very slowly moving polar projection map face unit 14, of the Northern Hemisphere which is constantly under a radar surveillance system, light unit 20, and a blinking space capsule, spacecraft element 18, moving with the Northern Hemisphere and the blinking flashes brighter each time the radar system crosses the path of the space capsule. The overall visual effect when there is an actual spacecraft in flight is that of the time indicating device simulating the actual flight and being readable to determine the relative time of day or night at any place within the hemisphere and to determined the position of the spacecraft relative to the earth at any time during the flight.

The invention may be embodied in other specific forms without departing from the spirit or essential characteristics thereof. The present embodiment is therefore to be considered in all respects as illustrative and not restrictive.

What is claimed and desired to be secured by Letters Patent is:

1. A time indicating device comprising:
   a housing;
   a numbered ring rigidly supported on said housing and having numbers to represent a twenty-four hour period;
   a circular face unit rotatably supported on said housing and having a polar projected outline of land and water of the Northern Hemisphere thereon and having appropriate polar projected time zone markings overlying said land and water outline to establish time zones therefor;

means operable to rotate said face unit relative to said numbered ring at a rate of one complete revolution in a twenty-four hour period thereby providing the capability of determining the time at any point on the Northern Hemisphere;

a spacecraft element rotatably supported on said housing and positioned adjacent said numbered ring and the periphery of said face unit; and means selecting operable to rotate said spacecraft element relative to said numbered ring.

2. A device as defined in claim 1 further comprising a second means selectively operable to rotate said spacecraft element at a rate faster than the rate of said face unit.

3. A device as defined in claim 2 wherein said second means includes control means operable to regulate the rate of rotation of said spacecraft element.

4. A device as defined in claim 1 further comprising a light unit located adjacent one side of said face unit to expose said face unit to the light when said unit is energized and means operable to rotate said light unit relative to said face unit to expose said face unit to a sweeping light effect.

5. A device as defined in claim 4 wherein said light unit rotating means includes gearing to rotate said light unit in a direction opposite to the rotation of said face unit and at a rate faster than said face unit.

6. A device as defined in claim 4 further comprising electrical connecting means effective to energize said light unit during its rotation.

7. A device as defined in claim 6 further comprising an electrical lamp carried by said spacecraft element and wherein said electrical connecting means includes an electrical interconnection between said light unit and said electrical lamp effective to induce a surge of electrical power to said lamp momentarily increase its intensity when said light unit crosses the moving spacecraft element.

8. A device as defined in claim 1 further comprising an electric lamp carried by said spacecraft element electrical connecting means effective to intermittently energize said lamp.

9. A device as defined in claim 1 further comprising an electric lamp carried by said spacecraft element, electrical connecting means including means effective to intermittently energize said lamp during the rotation of said spacecraft element.

10. A device as defined in claim 1 further comprising an electric lamp carried by said spacecraft element, a gear means, a light unit rotatable by said gear means and located adjacent one side of said face unit to expose said face unit to the light when said light unit is energized; and an electrical slip ring member supported by said gear means and having means for transmitting electrical power from a power source to energize said electric lamp during the rotation thereof and to energize said light unit during the rotation thereof.

11. A device as defined in claim 10 wherein said electrical slip ring member is rotatable by said gear means and carries said spacecraft element for rotation therewith; and wherein said rotatable light unit includes an electrical bridge carried thereby, said bridge being positioned in substantially radial alignment with said light unit; said slip ring member electrical transmitting means includes slip rings for continuously energizing said light unit during its rotation and includes slip rings electrically connected to said electrical lamp and contacts said bridge to momentarily provide additional electrical power to said lamp to increase the light intensity as said light unit crosses the spacecraft element.

References Cited

UNITED STATES PATENTS

| | | | |
|---|---|---|---|
| 2,144,922 | 1/1939 | Jacobs | 58—43 |
| 3,184,911 | 5/1965 | Canale et al. | 58—50 |

RICHARD B. WILKINSON, Primary Examiner

EDITH C. SIMMONS, Assistant Examiner

U.S. Cl. X.R.

58—50